United States Patent [19]
Bennin

[11] Patent Number: 5,835,306
[45] Date of Patent: Nov. 10, 1998

[54] INTEGRATED GIMBAL SUSPENSION ASSEMBLY WITH ASSYMETRIC BOND PAD

[75] Inventor: Jeffry S. Bennin, Hutchinson, Minn.

[73] Assignee: Hutchinson Technology Incorporated, Hutchinson, Minn.

[21] Appl. No.: 475,576

[22] Filed: Jun. 7, 1995

[51] Int. Cl.$^6$ .............................. G11B 5/48; G11B 21/16
[52] U.S. Cl. ............................................................. 360/104
[58] Field of Search ................................... 360/104, 106

[56] References Cited

U.S. PATENT DOCUMENTS

| | | | |
|---|---|---|---|
| 4,543,295 | 9/1985 | St. Clair et al. ........................ | 428/458 |
| 4,616,279 | 10/1986 | Poorman ................................ | 360/103 |
| 4,645,280 | 2/1987 | Gordon et al. ......................... | 339/17 F |
| 4,670,804 | 6/1987 | Kant et al. .............................. | 360/102 |
| 4,761,699 | 8/1988 | Ainslie et al. .......................... | 360/103 |
| 4,789,914 | 12/1988 | Ainslie et al. .......................... | 360/103 |
| 4,792,875 | 12/1988 | Ohdaira .................................. | 360/104 |
| 4,811,143 | 3/1989 | Ohashi et al. .......................... | 360/105 |
| 4,819,094 | 4/1989 | Oberg ...................................... | 360/104 |
| 4,823,217 | 4/1989 | Kato et al. .............................. | 360/104 |
| 4,839,232 | 6/1989 | Morita et al. ........................ | 428/473.5 |
| 4,853,811 | 8/1989 | Brooks, Jr. et al. .................... | 360/103 |
| 4,884,155 | 11/1989 | Spash ...................................... | 360/105 |
| 4,975,795 | 12/1990 | Spash ...................................... | 360/105 |
| 4,991,045 | 2/1991 | Oberg ...................................... | 360/104 |
| 4,996,623 | 2/1991 | Erpelding et al. ...................... | 360/104 |
| 5,001,583 | 3/1991 | Matsuzaki .............................. | 360/104 |
| 5,003,420 | 3/1991 | Hinlein .................................... | 360/104 |
| 5,006,946 | 4/1991 | Matsuzaki .............................. | 360/104 |
| 5,012,368 | 4/1991 | Bosier et al. ........................... | 360/104 |
| 5,027,239 | 6/1991 | Hagen ..................................... | 360/104 |
| 5,052,105 | 10/1991 | Mische et al. ......................... | 29/104 |
| 5,055,969 | 10/1991 | Putnam .................................. | 361/398 |
| 5,068,759 | 11/1991 | Matsuzaki .............................. | 360/103 |
| 5,074,029 | 12/1991 | Brooks, Jr. et al. .................... | 29/603 |
| 5,103,359 | 4/1992 | Marazzo ................................. | 360/104 |
| 5,111,351 | 5/1992 | Hamilton ................................ | 360/104 |
| 5,121,273 | 6/1992 | Slezak .................................... | 360/104 |
| 5,166,845 | 11/1992 | Thompson et al. .................... | 360/103 |
| 5,249,092 | 9/1993 | Russell-Smith et al. ............... | 360/104 |
| 5,519,552 | 5/1996 | Kohira et al. .......................... | 360/104 |

FOREIGN PATENT DOCUMENTS

| | | |
|---|---|---|
| 1329261 | 5/1994 | Canada . |
| 0 484 906 A2 | 5/1992 | European Pat. Off. . |
| 0 599 669 A2 | 1/1994 | European Pat. Off. . |
| 53-19015 | 2/1978 | Japan . |
| 53-30310 | 3/1978 | Japan . |
| 53-74414 | 7/1978 | Japan . |
| 57-167162 | 4/1982 | Japan . |
| 60-246015A | 12/1985 | Japan . |
| 4146516 | 5/1992 | Japan . |
| 4-219618 (A) | 10/1992 | Japan . |
| WO 93/15593 | 8/1993 | WIPO .............................. H05K 1/00 |

OTHER PUBLICATIONS

Reidenbach, IBM Technical Disclosure Bulletin, vol. 22 No. 4, Sep. 1979, pp. 1602–1603.

Hetke, et al., Flexible Silicon Interconnects for Microelectromechanical Systems, 1991 International Conference on Solid–State Sensors and Actuators, Digest of Technical Papers, pp. 764–767.

*Primary Examiner*—John H. Wolff
*Attorney, Agent, or Firm*—Faegre & Benson

[57] ABSTRACT

A head suspension for attachment to an actuator arm and for supporting a head slider within a rigid disk drive includes a load beam having a gimbal region provided adjacent a distal end of the load beam with a slider receiving aperture. A slider bond pad separately provided from the load beam is supported within the aperture by at least one conductive trace that also connects the slider bond pad to the load beam. An end portion of the conductive trace defines a gimbal axis about which the slider bond pad can rotate, and the slider bond pad is connected to the end portion of the conductive trace so that the majority of the slider bond pad is located to one side of the gimbal axis.

10 Claims, 5 Drawing Sheets

INTEGRATED GIMBAL SUSPENSION ASSEMBLY WITH ASSYMETRIC BOND PAD

BACKGROUND OF THE INVENTION

Suspension assemblies are spring structures in disk drives that position a read/write head assembly nanometers away from the rapidly spinning surface of a rotatable disk or other data storage device. The suspension assembly presses the head toward the disk surface with a precise force applied in a precisely determined location. The head assembly "flies" over the irregular (at this scale) surface of the disk at a height established by the equilibrium of the suspension assembly downward force and the increasing lift force of the air stream generated by the spinning disk as the head nears the disk.

A head suspension assembly (HSA) includes the suspension assembly, the head assembly, and an electrical interconnect assembly. The interconnect assembly is a collection of elements designed to conduct data signals to and from the head assembly. HSAs are used in magnetic hard disk drives, the most common today, or other type of drives such as optical disk drives.

The suspension assembly includes two spring structures, a load beam and a gimbal, each a carefully balanced combination of rigid regions and flexible spring regions. The load beam is a resilient spring plate designed to provide lateral stiffness and calibrated to apply the necessary load on the head assembly. The gimbal is a spring positioned at the distal end of the suspension assembly and of the load beam. The gimbal holds the head assembly at an appropriate orientation (flying attitude) and at a constant distance over the contours of the disk, even if the load beam flexes and twists. The head assembly is attached to the gimbal and includes a "head," a highly sensitive read/write transducer, attached to an air bearing slider. The head. assembly also includes electrical terminals configured for interconnection to the interconnect assembly for receiving and relaying data (read and write signals).

A magnetic read/write transducer transforms electrical write signals into small magnetic fields. The magnetic fields magnetize domain patterns on a magnetic disk. The order of the magnetic fields and their subsequent orientation defines a bit code representing the stored data. A magnetic read transducer "reads" these domains fields as it flies over them and converts them back into electrical signals.

The suspension assembly can be attached at its proximal end to a rigid arm or directly to a linear or rotary motion actuator. The actuator rapidly moves (and then abruptly stops) the HSA over any radial position on the disk. Such radial HSA movement and the rotation of the disk allow the head to quickly reach every location on the disk surface. The rapid stop and go movement causes very high stresses on the HSA.

The closer the head assembly can fly to the surface of a magnetic disk, the more densely information can be stored (the strength of a magnetic field varies proportionally to the square of the flying distance, thus the smaller the head's flying clearance, the smaller the magnetic "spot" of information can be). Manufacturers of disk drives strive to reach flying clearances close to 100 nanometers=0.1 micrometers (a human hair is about 100 micrometers thick). However, the head assembly must not touch the disk ("crash"), since an impact with the spinning disk (rotating at about 3600 rpm or faster) can destroy both the head, the surface of the disk, and the stored data.

Amplifying and control electronic circuits process, send, and receive the data signals to and from the head assembly. Signal transmission requires conductors between the dynamic "flying" head and the circuitry. Traditional head assemblies complete a read/write circuit loop with two conductors, usually copper wires encapsulated in a plastic sheeting. Newer magneto-resistance head assemblies require four or more independent conductors. The interconnect assembly includes the conductors and accompanying insulators and connectors.

Designers and manufacturers of HSAs face competing and limiting design considerations. During operation, the suspension assembly should be free of unpredictable loads and biases which alter the exact positioning of the head assembly. The suspension assembly should respond instantaneously to variations in the surface topology of a disk. Alterations to the flying height of the head can significantly affect data density and accuracy and even destroy the system in a crash.

Rigidity and stiffness increase in relation to the third power of cross-sectional thickness. To respond to air stream changes and to hold the flying head at the appropriate orientation, suspension assemblies are very thin and flexible, specially around the sensitive spring and gimbal areas. Interconnect assembly conductors have a large effect on suspension assembly performance. Conductor stiffness alone greatly affects the rigidity of the spring regions and flight performance. A standard conductor placed atop of a thin suspension can more than double a spring region's stiffness and detract from the ability of the spring region to adjust to variations in the surface of the disk, vibrations, and movement. The effect of the conductors on a gimbal region, the thinnest and most delicate spring in the suspension assembly, is even more pronounced. Conductors placed over spring regions must not plastically deform (become permanently bent) when the spring regions flex, since such deformation hinders the return of the spring to its normal position and applies a torque on the slider.

The ideal HSA comprises components low in mass. Excessive inertial momentum caused by excessive mass can cause overshoot errors. Overshoot errors occur when momentum carries the whole HSA past the intended stopping point during positioning movement. Low-in-mass HSAs are also easier to move, resulting in power savings in multiple platter disk drives.

The manufacture of HSAs, like that of any commercial product, must be efficient. Reduction of manufacturing steps is desired. Damaged or misaligned components introduce biases and loads and drastically diminish the manufacturing useful output yield. Complex shaping and mounting processes are costly and decrease the reliability of the whole HSA manufacturing process.

To avoid defects and unpredictable loads and biases, exacting tolerances are necessary. During the HSAL manufacturing and assembling process, the buildup of deviations from tolerance limits causes planar deviations that can affect the flying attitude of the head assembly. The parameters of static roll and static pitch torque in the final HSA result from these inherent manufacturing and assembly tolerance buildups.

Mounting and placement of current interconnect assemblies is usually done by hand. Hand mounting is imprecise and costly. Precise conductor placement is especially critical in the delicate gimbal region. As the industry transitions to smaller slider/transducer sizes to increase data storage density, limitations of the current interconnecting devices increase the potential for read/write errors and impose ceilings on data storage density.

Using current interconnect technology, workers bond two to five lengths of wire to the head assembly, using fixturing to manage the wires while adhesively bonding the head assembly to a stainless steel suspension. Next, the lengths of wire are shaped by hand, using tweezers and tooling assistance to form a service loop between the head assembly and the suspension assembly and to position the wire along a predetermined wire path on the suspension assembly. The wires are tacked to the suspension using adhesive or wire capture features formed into the suspension. Special care is taken to avoid pulling the service loop too tight or allowing it to remain too loose. A tight service loop places an unwanted torque on the slider causing flying attitude errors. Loose service loops may allow the wire to sag down and scrape on the spinning disk. Both conditions are catastrophic to drive performance. Through-out the process of handling the slider and wires there is a risk of damaging the wires or the delicate load beam and gimbal. Load beams or gimbals accidentally bent during the manufacturing operations are scrapped. Often the head assembly also cannot be recovered, adding additional losses to the scrap pile.

SUMMARY

The present invention is new laminate structures for use in head suspension assemblies (HSAs) and a method to manufacture the laminate structures. The present laminate structures eliminate manual handling of conductors by integrating the manufacture of the interconnect assembly with that of the suspension assembly. Reduction in handling minimizes handling damage, thereby reducing damaged components and increasing manufacturing yields. Since the suspension assembly and the interconnect assembly are manufactured together, the variability of the alignment of the component (standard deviation) is minimal. Errors during mechanical performance are therefore reduced. Conductor geometry is always precise and no expensive and time-consuming manual fixturing during assembly is required. Less handling, less bent parts, and less assembly errors result in a more consistent fly height performance and more efficient manufacturing process.

The invention is an integral lead suspension for attachment to an actuator arm in a disk drive. The head suspension which is adapted for gimballing support of a magnetic read/write head slider combines a load beam element constructed from a structural metal material and configured at its proximal end for attachment to the actuator arm. The load beam element has a slider receiving aperture therein adjacent the distal end thereof. The combination also includes a slider bond pad constructed from the layer of structural metal material and separate from the load beam element. The slider bond pad element is adapted for bonding to a slider bond pad area comprising less than half of the top surface area of the slider. The load beam element is characterized by having at least two traces patterned on the surface thereof, each of said traces constructed from the layer of conductive material and at least one of said traces patterned onto and insulated from the surface of the load beam. Additionally, the distal ends of at least two of the traces are projecting inwardly into the slider receiving aperture with the distal ends of the traces patterned onto and supporting the gimbal bond plate for gimbal movement of a slider mounted thereon about at least one gimbal axis in the slider receiving aperture and at least one of said traces adapted for electrical connection to terminal pads on the head slider.

DETAILED DESCRIPTION OF THE INVENTION

Figure 1:
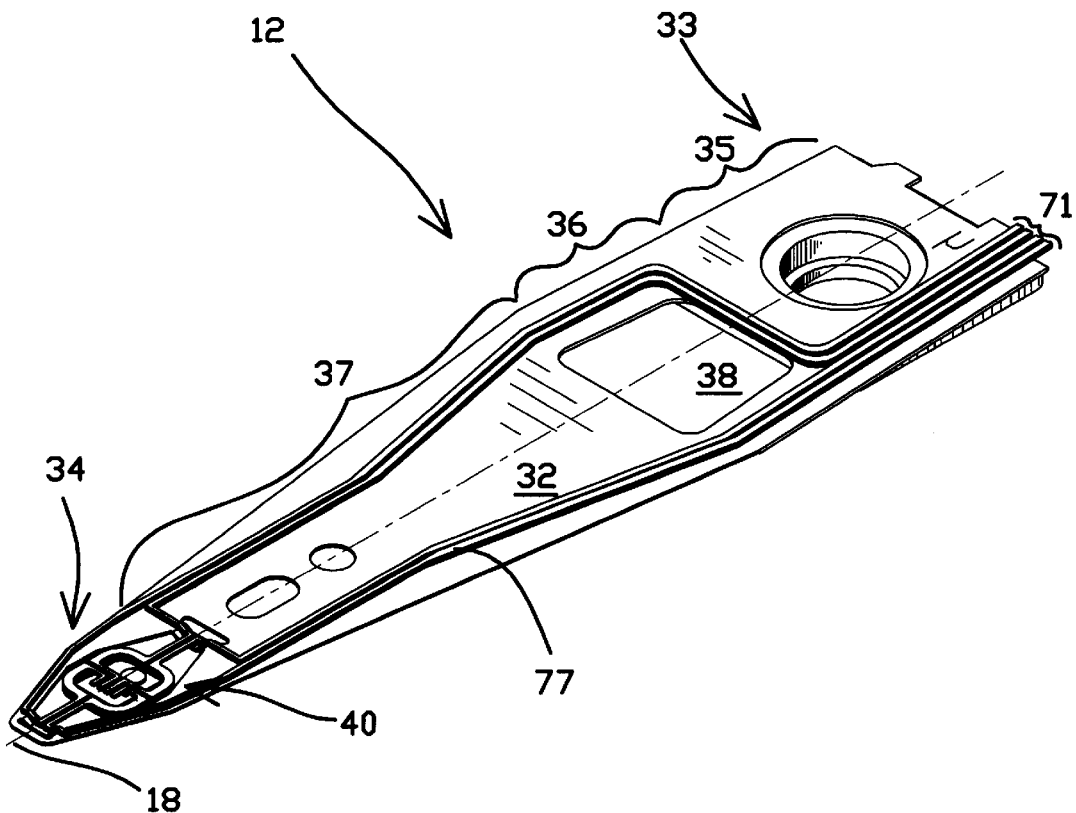
FIG. 1 is an isometric view of a first embodiment of a head suspension assembly in accordance with the present invention.

FIG. 1 shows a first embodiment of an HSA 12 manufactured in accordance with the present invention. The suspension is shown aligned with a longitudinal axis 18. As described in detail in U.S. Pat. No. 5,491,597 entitled GIMBAL FLEXURE AND ELECTRICAL INTERCONNECT ASSEMBLY, granted Feb. 13, 1996, U.S patent application Ser. No. 08/227,978 entitled ELECTRICAL TRACE INTERCONNECT ASSEMBLY, filed Apr. 15, 1994, and U.S. patent application Ser. No. 08/249,117 entitled LAMINATED STRUCTURES FOR A DISK DRIVE SUSPENSION ASSEMBLY, filed May 25, 1994, the entire disclosures of which are incorporated herein by reference, HSA 12 is manufactured by an etching process from a laminate sheet comprised of a layer of structural metal material such as stainless steel, a sheet of conductive metal material such as Beryllium-Copper alloy and a layer of insulating sheet material inserted between and adhesively bonded to both of the metal layers.

Load beam 32 which was etched or cut from the layer of structural metal material includes a proximal end 33, a distal end 34, a base region 35 adjacent the proximal end 33, a rigid region 37, and a spring region 36 an intermediate of the base region 35 and rigid region 37. Spring region 36 has a spring aperture 38, the relative dimensions of which may be selected to tailor the stiffness of the spring region 36.

Figure 2:
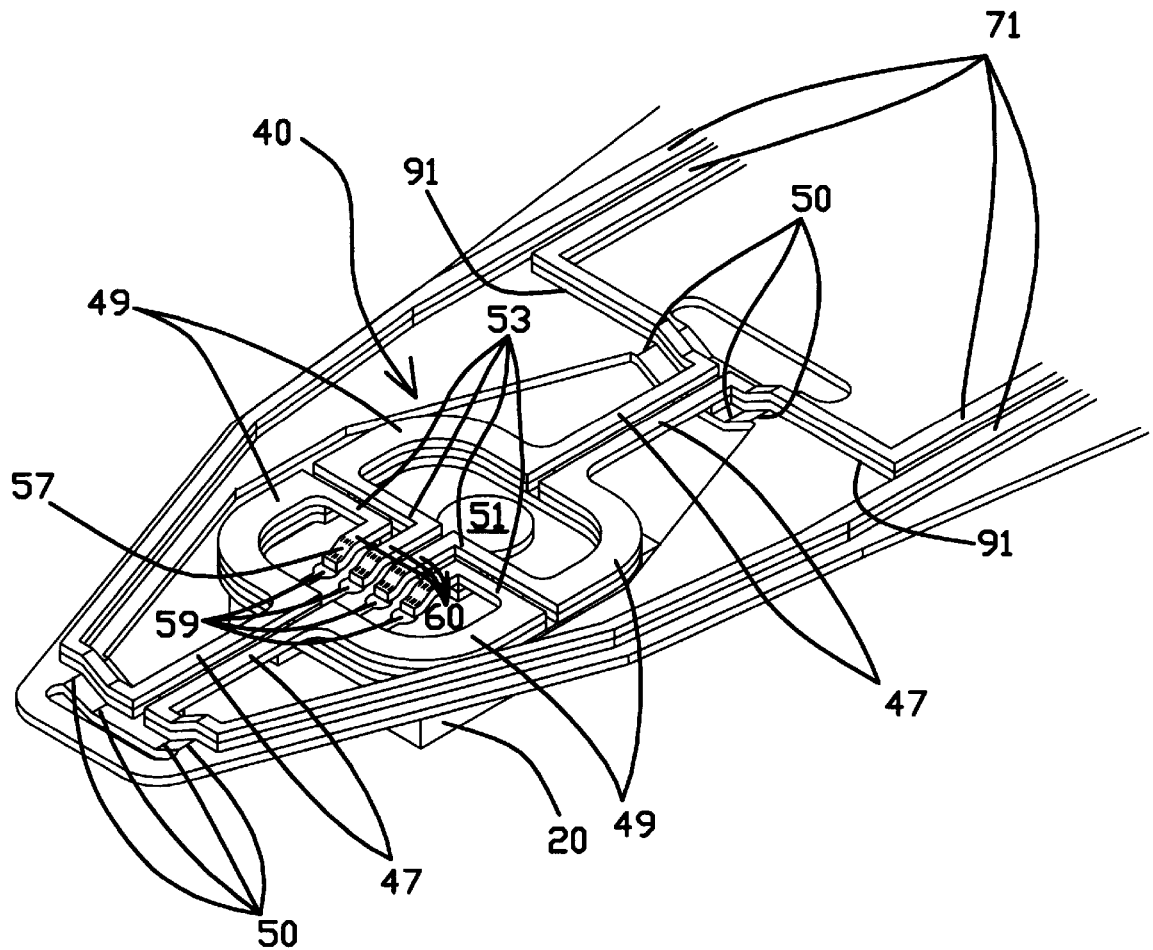
FIG. 2 is a detail enlarged view of the gimbal portion of of the head suspension assembly shown in FIG. 1 and a slider.
Figure 3:
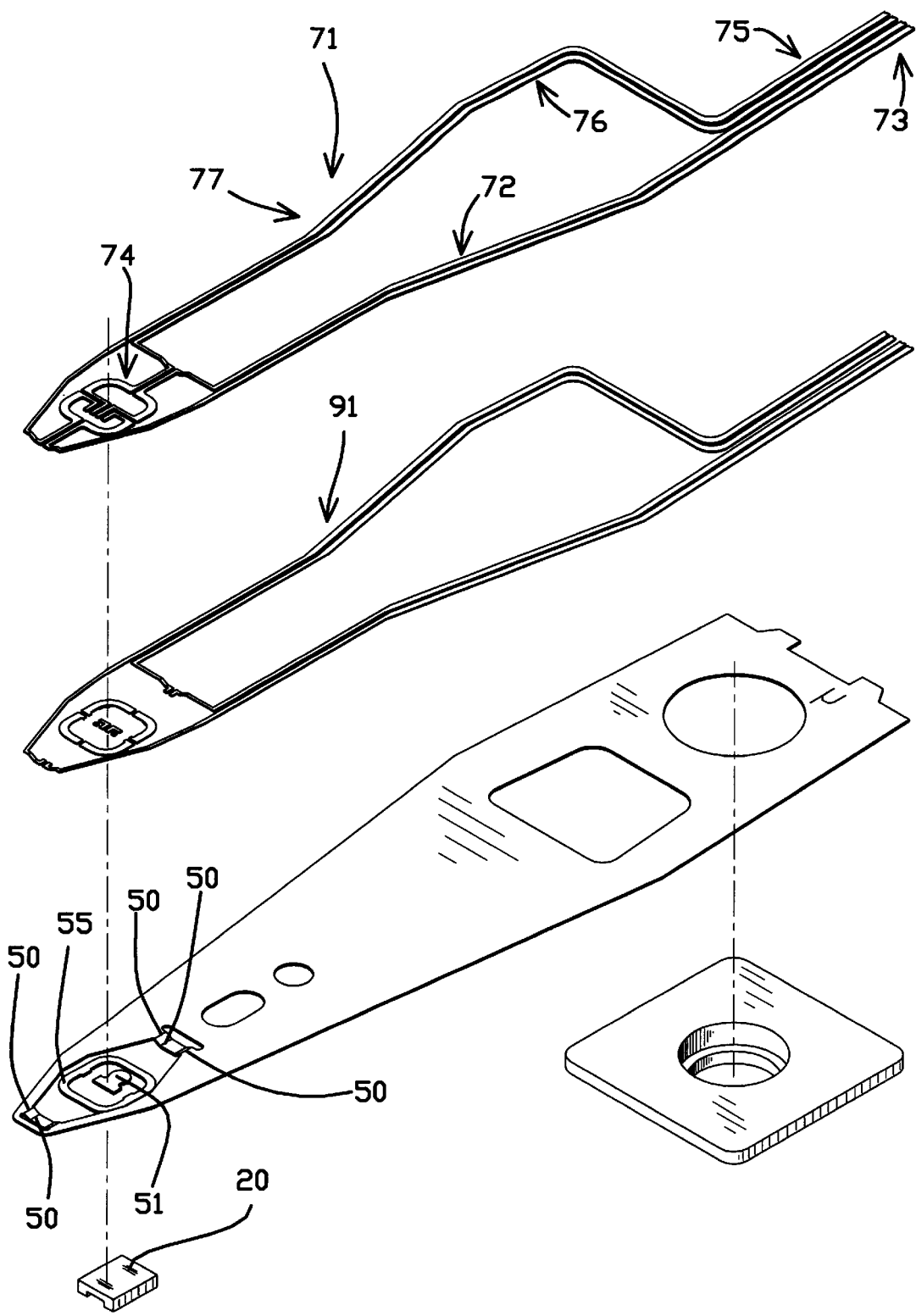
FIG. 3 is an exploded perspective view of the suspension assembly shown in FIG. 1.

As illustrated in FIGS. 1–3, the integrated lead interconnect circuitry comprises four conductive electrical traces 71 extending the length of the load beam 32 and associated insulation regions 91 which adhesively and insulatively bond conductive traces 71 to load beam 32. The configuration of the separate layers may be seen more clearly in FIG. 3, where the layers are shown exploded away from each other.

Figure 4:
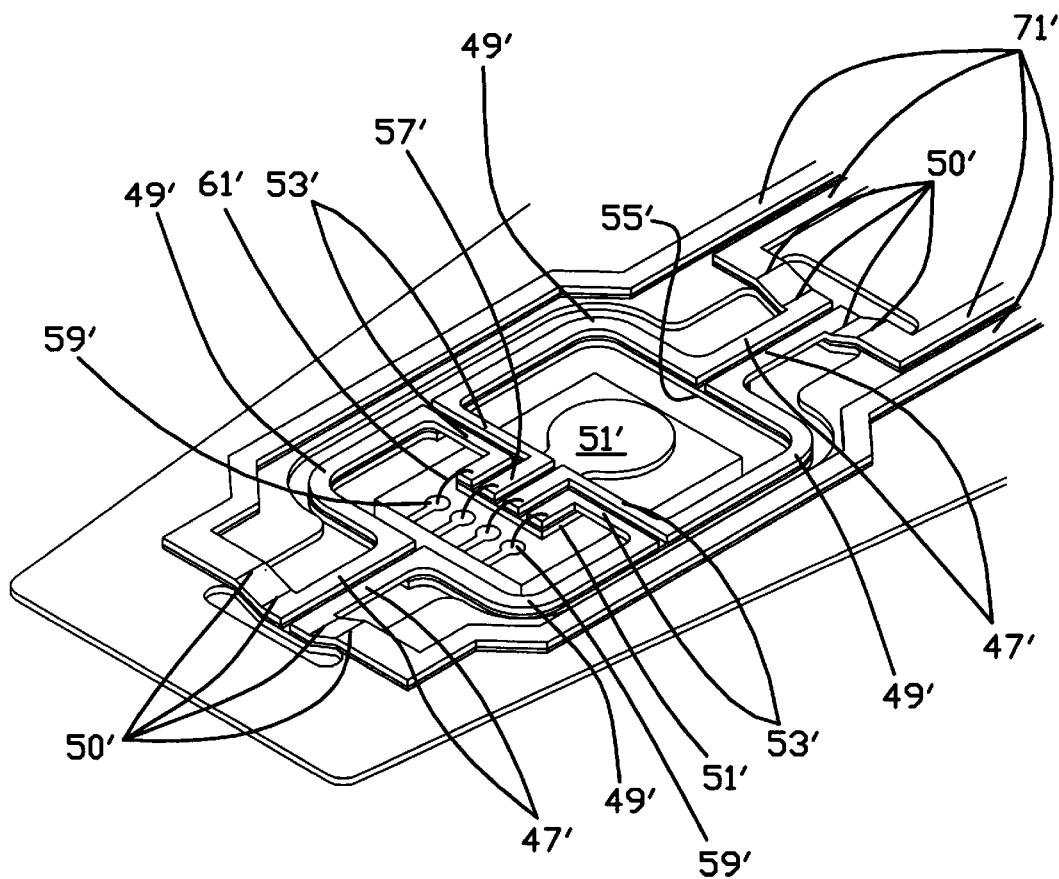
FIG. 4 is a detail enlarged view of the gimbal of a second embodiment of the head suspension assembly and a slider.
Figure 5:
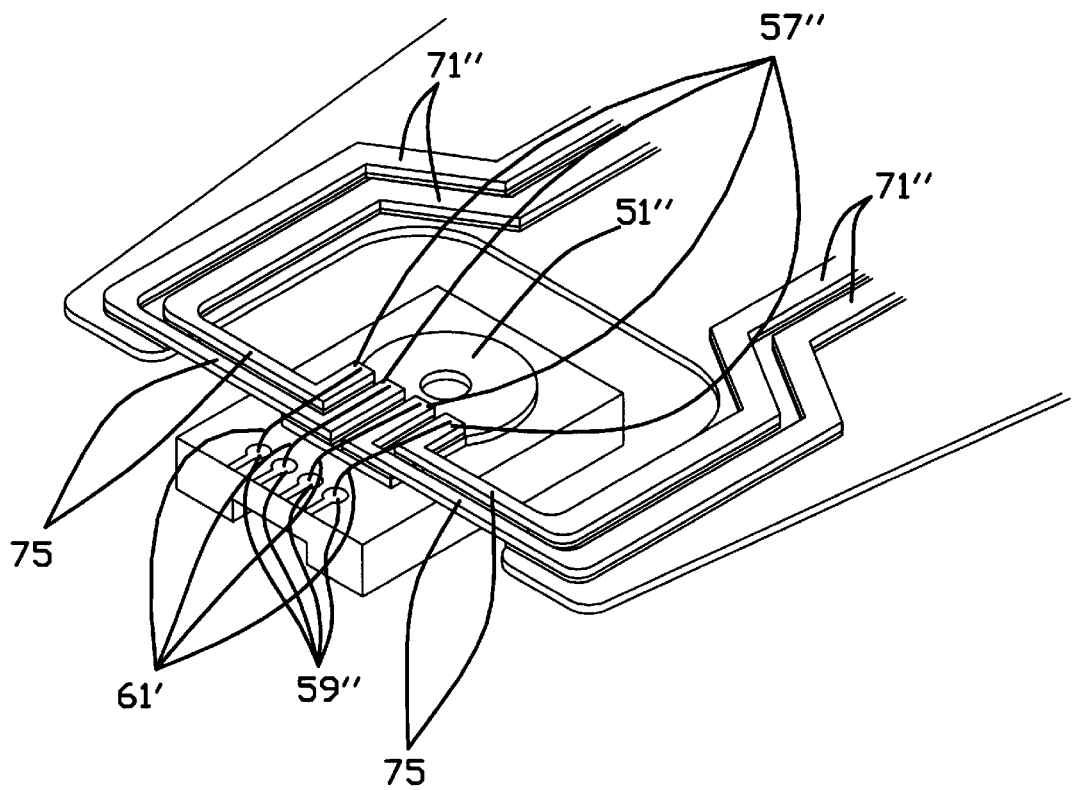
FIG. 5 is a detail enlarged view of the gimbal of a third embodiment of the head suspension assembly and a slider.

The electrical connection of the traces to the head slider are shown in FIG. 2 for the first embodiment and FIGS. 4 and 5 for the second and third embodiments respectively. Further suitable electrical circuit connection means are shown, for example, in FIGS. 21–23 of previously identified application Ser. No. 08/249,117 which is incorporated herein by reference.

Traces 71 are elongated and resilient pre-patterned electrical conductors that connect electrical. signals from the head assembly 20, across the gimbal region and along the HSA and beyond its proximal end to amplifying and control electronics (not shown). The traces 71 include a proximal end 73, a region adjacent the distal end of the load beam, a load beam region 72 adjacent the proximal end 73, and a gimbal region 74. The width and the thickness of traces 71 can be varied at or within the different regions to affect the mechanical stiffness of the trace and/or to change its electrical resistance.

The load beam region 72 of traces 71 includes a proximal base region 75, a middle or spring region 76, and a distal, rigid region 77. In the present embodiment, the gimbal regions 74 of traces 71 function as elements of gimbal assembly. The mechanical and electrical properties of the BeCu alloys used for traces 71 allow the traces 71 to act not only as electrical conductors in the electrical interconnect assembly, but also to function as a mechanical gimbal spring elements. Because the present interconnect assembly acts as both an electrical interconnect assembly and as a mechanical gimbal spring, it is referred to as an integrated gimbal-interconnect assembly.

In the present embodiment, the rigid regions 77 of the traces 71 also act as stiffening reinforcement regions that give added rigidity to the rigid region 37 of the interconnect-suspension assembly thereby modifying the resonance response of the interconnect-suspension assembly. In the embodiment shown, the rigid regions 77 of traces 71 act as stiffening for the rigid region 37 without the need for either the rails or flanges that are customarily used in the prior art load beams for that purpose. In other applications both stiffening traces and reinforcing rails or flanges may be used to achieve the desired performance characteristics for the suspension.

The thickness and/or width of the rigid region 77 of the traces 71 can be increased to increase their stiffness while reducing also their electrical resistance.

In FIG. 1, the traces 71 extend slightly past the proximal end 33 of the HSA 12. The traces 71 can either extend all the way back to amplifying and processing circuitry placed on the actuator arm (not shown) or on the frame of the disk drive (also not shown) or can be connected to an intermediate wiring harness as may be desired.

As shown most clearly in FIG. 2 for the first suspension embodiment gimbal 40 provides gimballing support to the head slider assembly 20. It mechanically maintains head assembly 20 correctly oriented with respect to and optimally spaced from the recording surface of the rotating disk, regardless of the movements and twists experienced by the load beam 32 during actuator motion or minor variations in the topography of the disk In the first embodiment of the invention disclosed herein, the gimbal 40 not only performs a mechanical gimbal function but also performs electrical functions. For example, in all three embodiments of the present invention, there is no separate flexure structure that is required to be welded to the load beam. Instead, the lead traces 71 are extended along the longitudinal axis of the load beam 32 to serve mechanically in the gimbal 40 as gimbal torsion springs 47.

The torsion springs 47 of leads 71 each have a thickness and overall cross-section to serve, in the aggregate, the same mechanical spring function as the torsion springs of conventional integrated gimbal suspensions.

As can be seen particularly in FIG. 2, torsion springs 47 are not supported by the sheet material of the distal apex of the main structure of the load beam 32. They may or may not have a layer of dielectric material such as 95 on them in the torsion spring portion of the flexure region. In the embodiment shown in FIGS. 1 through 3 herein, there is no dielectric material on the torsion spring portions 47 of conductive traces 71.

As is the case with integrated flexure suspensions that do not include integrated trace conductors, suitable forming of the gimbal region is carried out to provide clearance between the head slider mounted for gimballing motion and the load beam 32 and gimbal 40. The form lines 50 can best be discerned in FIG. 2 for the embodiment of FIGS. 1 through 3. If the size of the head slider were substantially reduced relative the the gimbal 40 so the the entire surface area of the top of the slider were enclosed within the gimbal rings 49 the extent of the forming necessary for proper operation could be reduced or eliminated.

In FIG. 2 it can be seen that the bond pad 51 which is to be secured to the top surface of head slider 20 is asymmetrical in that it only projects substantially into the distal half of the space within the area enclosed by gimbal rings 49. That space is also defined as the portion of the space enclosed by the gimbal ring 49 which is proximal to the pitch gimbal axis defined by the pitch torsion segments 53 of trace conductors 71. The reason that the asymmetrical bond pad 51 is used in this embodiment is to avoid covering the entirety of the top surface of head slider 20 to allow the making of electrical connections from the conductive traces to the top surface electrical signal pads.

As can be seen in FIG. 2, in the first embodiment it is the conductive trace 71 alone that provides the pitch axis torsion spring segments 53. In other words, in the embodiment shown the laminate from which the suspension and traces were manufactured has the insulating and stainless steel layers removed from the area adjoining the traces where the traces serve as the gimbal torsion springs 47 and the torsion segments 53. If it is desired to have extremely stiff springs, the insulation and stainless steel layers can be left during the etching process. FIG. 3 illustrates in exploded form the three layers of the laminate after etching. In FIG. 3 the assymetric bond plate is shown within the gimbal ring stainless layer 55

The terminal end portions 57 of traces 71 which overlie bond plate 51 are aligned with the longitudinal axis of the suspension and project over the edge of the bond plate 51 to be accessable to the terminal pads 59 on the top surface of the slider 20. In fact the terminal pads 59 themselves may include conductive material to bring signals from terminals on the end wall of the head slider to terminal pads on the top surface thereof. In the first embodiment the preferred method of making the attachment is a direct bonding of the projecting ends 57 of the traces 71 to the terminal pads 59 on the top surface of the head slider 20. The portions 60 of the traces 71 between the terminal end portions 57 connected to the slider 20 and the portions serving as the gimbal rings 49 and gimbal torsion springs 47 are supported by the bond pad 51.

The bond pad 51 is also typically manufactured from the same laminate used to manufacture the remainder of the suspension in accordance with previously identified application Ser. No. 08/249,117.

Slider 20 is securely bonded to bond pad 51. Once the slider is mounted on bond pad 51, the same sorts of lead connection methodologies illustrated in the previously identified application Ser. No. 08/249,117 are used to provide appropriate electrical connections between the terminals 59 of slider 20 and conductive traces 71.

FIG. 4 shows a second embodiment of the present invention. Again the suspension is an integrated gimbal suspension where there is no separate flexure attached to the load beam. In the second embodiment the slider has a top surface area which is enclosed within the gimbal ring 55' so that the slider may pivot into the gimbal ring area. The suspension includes forming at form lines 50' to offset the plane of the bond pad from the remainder of the suspension and flexure but the forming may be deleted if desired.

The second embodiment is also distinguishable from the first embodiment by the provision of terminal end portions 57' that do not project in unsupported fashion from bond pad 51'. In this embodiment the connections to the terminal pads 59' on the head slider are made using jumpers 61 and conventional wire bonding techniques.

A third embodiment of the invention is discliosed in FIG. 5. In that embodiment the portions of the traces 71" adjacent the distal end become the pitch axis torsion springs 75 and then support an assymetrical bond plate 51". This embodiment differs from the structure of the first embodiment shown in FIGS. 1 through 3 where the traces 71 provide pitch axis torsion springs and roll axis support.

In the third embodiment, the terminal end portions 57" of traces 71" are aligned with the suspension axis and oriented toward-the proximal end of the suspension and terminate without projecting beyond the supporting surface of the bond plate 51". Such an arrangement is suited to the use of jumpers 61' attached using wire bond techniques for connecting the traces to the terminal pads 59" on the slider. An alternative connection approach, not separately illustrated, would be providing elongated traces 71" which project over the edges of the pad 51" for making connections in a manner entirely analogous to that shown in connection with the first embodiment.

The invention is not to be taken as limited to all of the details thereof as modifications and variations thereof may be made without departing from the spirit or scope of the invention.

What is claimed is:

1. A head suspension for attachment to an actuator arm and for supporting a head slider within a rigid disk drive, said head suspension comprising:

a load beam having an actuator mounting region at its proximal end for attaching said load beam to an actuator arm, a rigid region intermediate of said actuator mounting region and a gimbal region provided adjacent a distal end of said load beam, said gimbal region including a slider receiving aperture;

a slider bond pad separately provided from said load beam and having a slider mounting surface to which the slider is to be attached; and at least one conductive trace patterned on and insulated from a surface of said load beam, said conductive trace having an end portion that projects within said slider receiving aperture and which is also connected to said slider bond pad for supporting it within said slider receiving aperture, said end portion of said conductive trace defining a gimbal axis about which said slider bond pad can rotate, and said slider bond pad being connected to said end portion of said conductive trace so that the majority of said slider bond pad is located to one side of said gimbal axis.

2. The head suspension of claim 1, wherein a terminal end of said end portion of said conductive trace is positioned to provide an electrical connection to an electrical terminal pad of the slider.

3. The head suspension of claim 2, wherein said terminal end of said end portion of said conductive trace is provided on a portion of said slider bond pad.

4. The head suspension of claim 3, wherein said portion of said slider bond pad on which said terminal end is provided extends in an opposite direction from said gimbal axis than the majority portion of said slider bond pad.

5. The head suspension of claim 2, wherein said terminal end of said end portion of said conductive trace projects from an end of said slider bond pad in a direction opposite from the direction of extension of the majority portion of said slider bond pad.

6. The head suspension of claim 5, wherein said terminal end of said end portion of said conductive trace that projects from said slider bond pad is bent to facilitate connection thereof directly to an electrical terminal pad of the slider.

7. The head suspension of claim 1, further including a plurality of conductive traces patterned onto and insulated from the surface of said load beam, at least a pair of end portions of said conductive traces extend into said slider receiving aperture to define said gimbal axis and support said slider bond pad.

8. The head suspension of claim 7, wherein said gimbal axis extends substantially transversely to a longitudinal direction of said load beam.

9. The head suspension of claim 8, wherein a second pair of end portions of said conductive traces also extend into said slider receiving aperture to define a second gimbal axis about which said slider bond pad can rotate.

10. The head suspension of claim 9, wherein each end portion of said first and second pair of end portions includes a terminal end that is positioned to provide an electrical connection to an electrical terminal pad of the slider.

* * * * *